United States Patent
Taghavi

(10) Patent No.: US 7,109,135 B2
(45) Date of Patent: Sep. 19, 2006

(54) SOFT TACTILE COATING FOR MULTI-FILAMENT WOVEN FABRIC

(75) Inventor: Shane Taghavi, Toronto (CA)

(73) Assignee: Central Products Company, Menasha, WI (US)

( * ) Notice: Subject to any disclaimer, the term of this patent is extended or adjusted under 35 U.S.C. 154(b) by 93 days.

(21) Appl. No.: 10/727,122

(22) Filed: Dec. 3, 2003

(65) Prior Publication Data

US 2004/0166752 A1    Aug. 26, 2004

Related U.S. Application Data

(60) Provisional application No. 60/430,475, filed on Dec. 3, 2002.

(51) Int. Cl.
*B32B 27/32* (2006.01)
*B32B 27/02* (2006.01)
*B32B 27/06* (2006.01)
*B32B 27/12* (2006.01)

(52) U.S. Cl. .......................... 442/170; 442/62; 442/65; 442/101; 442/102; 442/104; 442/171; 442/203; 264/13; 264/464; 252/8.91

(58) Field of Classification Search ................ 442/102, 442/104, 170, 203, 62, 65, 101, 171; 106/218; 252/8.91; 264/13, 464
See application file for complete search history.

(56) References Cited

U.S. PATENT DOCUMENTS

| | | | |
|---|---|---|---|
| 2,299,807 A | 10/1942 | Dunbar | |
| 3,125,462 A | 3/1964 | Rachinsky | |
| 4,351,876 A | 9/1982 | Doi et al. | |
| 4,471,018 A | 9/1984 | Kritchevsky et al. | |
| 4,490,934 A | 1/1985 | Knapp | |
| 4,531,994 A | 7/1985 | Holtrop et al. | |
| 4,592,158 A | 6/1986 | Seely | |
| 4,636,427 A | 1/1987 | Ohno et al. | |
| 4,694,601 A | 9/1987 | Dicke et al. | |
| 4,844,958 A | 7/1989 | Chapman et al. | |
| 4,980,984 A | 1/1991 | Kulp et al. | |
| 4,999,938 A | 3/1991 | Behling | |
| 5,016,372 A | 5/1991 | Gold | |
| 5,071,699 A | 12/1991 | Pappas et al. | |
| 5,175,646 A | 12/1992 | Eden | |
| 5,480,705 A | 1/1996 | Tolliver et al. | |
| 5,986,000 A * | 11/1999 | Williams et al. | 525/88 |
| 5,994,242 A | 11/1999 | Arthurs | |
| 6,432,542 B1 * | 8/2002 | Tsai | 428/421 |
| 6,833,333 B1 * | 12/2004 | Reisdorf et al. | 442/64 |
| 2002/0107328 A1 | 8/2002 | Laughner et al. | |

OTHER PUBLICATIONS

Advanced Elastomer Systems, L.P., Santoprene General Product Bulletin: Santoprene Thermoplastic Rubber, 2001, U.S.A., no month.

* cited by examiner

*Primary Examiner*—Andrew T. Piziali
(74) *Attorney, Agent, or Firm*—Roberts, Mardula & Wertheim, LLC

(57) ABSTRACT

A polyolefin woven fabric extrusion coating with superior soft tactile characteristic is disclosed comprising ethylenic elastomer and thermoplastic vulcanizate. The combination performs in a synergistic fashion to obtain more pleasing soft tactile characteristic than is available with either elastomer or thermoplastic vulcanizate alone. The inclusion of additives may enhance properties and include plastomer, UV stabilizers, flame retardant, antiblock, colorant, printable additives and polar additives.

12 Claims, 1 Drawing Sheet

SOFT TACTILE COATING FOR MULTI-FILAMENT WOVEN FABRIC

CROSS REFERENCE TO OTHER PATENT APPLICATIONS

This application claims priority under 35 U.S.C. §119 from U.S. provisional patent application serial No. 60/430,475 filed Dec. 3, 2002 of the same inventor, which is incorporated by reference in its entirety.

BACKGROUND OF THE INVENTION

The present invention relates to soft feel coatings suitable for coating multi-filament woven fabric and products comprising fabrics coated with soft-feel coatings as well as methods of producing such products.

Soft feel woven-coated fabrics are suitable for use in applications such as clothing textiles, furniture textiles, pool covers, banners and billboard fabrics, rental tent fabrics, truck tarps, cargo container covers and water tank or reservoir covers. Desirable properties include, pleasing tactile finish, good adhesion between the coating and fabric, strength, durability, flexibility, chemical and temperature resistance and recyclability.

Prior soft feel woven-coated fabrics comprised poly vinyl chloride (PVC) coated fabrics. As landfill sites are becoming less common, there is a greater tendency to dispose of articles that contain PVC through incineration. The incineration of PVC can produce hydrochloric acid. It is feared that the hydrochloric acid enters the atmosphere and produces acid rain. It also is feared that dioxins and furans are liberated when PVC is burned at municipal incinerators. Discussions are underway in many nations to ban PVC because of its potentially harmful effect on the environment.

In addition to its environmental problems, flexible PVC-containing articles also pose the problem of having a low molecular weight plasticizer migrate to the surface of the PVC layer. The PVC layer typically contains a low molecular weight plasticizer to impart flexibility to the layer over a wide range of temperatures. This plasticizer is fairly mobile in the PVC layer and usually migrates out of the article, leaving it with a semi-tacky outer surface onto which dirt and other particles can adhere. The migration of the plasticizer also can cause the PVC article to be less flexible, it can allow the plasticizer to enter other articles that are adjacent to the PVC article, and it can interfere with the application of ink on the surface of the article. Further, the most common plasticizer for flexible PVC is carcinogenic to laboratory animals, although a direct link to humans has not been proved. Although high molecular weight plasticizers may be used, which do not migrate out from the interior of the PVC layer, these plasticizers do not impart good flex crack resistance to the PVC-containing article.

Articles are known which comprise fabrics secured to polymeric layers that contain polymers other than PVC. Examples of such articles have been disclosed in the following documents: U.S. Pat. Nos. 4,844,958, 4,636,427, 4,531,994, 4,471,018, 4,351,876, 3,125,462, and 2,299,807. However, none of these patents disclose that such products have good flex-crack resistance so as to be a suitable alternative for a plasticized, PVC-containing article.

Roll-up signs are well known in the outdoor display and traffic control materials art. These signs are portable and can be folded or rolled up for transport and storage until being used again in a non-rolled up or extended condition. Examples of roll-up signs are shown in U.S. Pat. Nos. 5,175,646, 5,016,372, 4,999,938, 4,980,984, 4,694,601, 4,592,158, and 4,490,934. The signs typically comprise a reflective layer having an indicia on the front side and a PVC coated fabric on the back side. In U.S. Pat. No. 5,016,372, a roll-up sign is disclosed that is made of polyethylene plastic.

Other approaches to eliminate PVC include use of polyolefins that are selected for being recyclable and nonpolluting. The polyolefins include, low-density polyethylene, high-density polyethylene linear low-density polyethylene, polypropylene homopolymer, and copolymers of such polyolefins. Polyolefins may be used for both the coating materials and for woven fabric. Particularly preferred for the woven fabric are polypropylene homopolymer and copolymers. Polypropylene has the advantages of flexibility, light weight, low cost and stain resistance. Polypropylene has the disadvantage of poor adhesion to many coating materials.

Of the hundreds of potential polyolefin coatings, very few have produce soft feel products with flexibility and good adhesion to polyolefin woven fabrics. Polyolefin elastomers offer a reasonable chance of success for a desired coating. Traditional polyolefin elastomers include ethylene elastomers such as ADVANTECH® brand elastomer from DuPont, ENGAGE® brand elastomers from Dupont Dow elastomers, and FLEXOMER® brand elastomers from Union Carbide.

An alternate to polyolefin elastomer is SANTOPRENE® brand bondable thermoplastic vulcanizate (TPV). SANTOPRENE® is available in many grades from Advanced Elastomer Systems (AES) of Akron, Ohio. SANTOPRENE® is described as fully dynamically vulcanized EPDM rubber particles in a thermoplastic matrix of polypropylene.

Difficulties are encountered in using elastomer or thermoplastic vulcanizates as fabric coating. Such coatings are often of low abrasion resistance, low adhesion or sticky or tacky. Further such coatings are unable to attain the desired soft tactile characteristic of the present invention.

Accordingly, it is a general object of the present invention to provide a soft tactile coating for polyolefin fabrics with superior tactile, abrasion resistance, flexibility and adhesion characteristics. Another object of the present invention is to provide a soft tactile woven polyolefin fabric of recyclable materials utilizing such coatings.

BRIEF SUMMARY OF THE INVENTION

It is the object of this invention to provide superior soft tactile characteristics in coatings for polyolefin woven fabrics of multi-filament yarns.

Coatings of the present invention comprise from 30 to 50% by weight thermoplastic vulcanizate wherein the thermoplastic vulcanizate has a Shore A hardness grade of 55 to 80 and from 30 to 50% by weight of polyolefin elastomer wherein the polyolefin elastomer has a melt index of less than or equal 5.0. These coatings may also include amounts of plastomer, UV stabilizers, flame retardant, antiblock, colorant, printable additives and polar additives.

Coated fabrics of the present invention have an inner polyolefin woven fabric coated top and bottom with superior soft tactile characteristic coatings. Polypropylene woven fabric is preferred for the inner woven fabric.

DETAILED DESCRIPTION OF THE INVENTION

The present invention is directed toward recyclable soft tactile coated woven fabrics and the coatings used in their manufacture. Surprisingly it has been discovered that superior tactile sensation coatings are produced when the coatings comprise thermoplastic vulcanizate and ethylenic elastomer.

Figure 1:
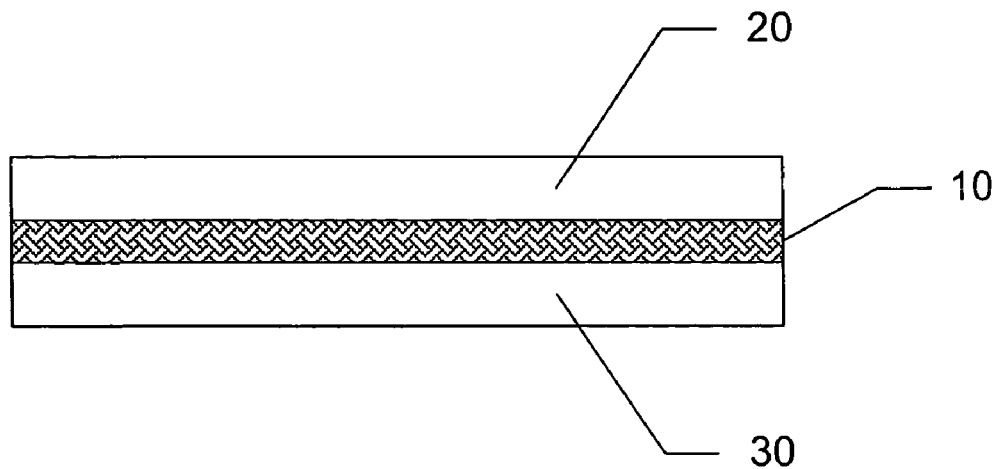
FIG. 1 illustrates a sectional view of a soft tactile coated woven fabric of the present invention with a single upper and single lower soft tactile coating layers.
Figure 2:
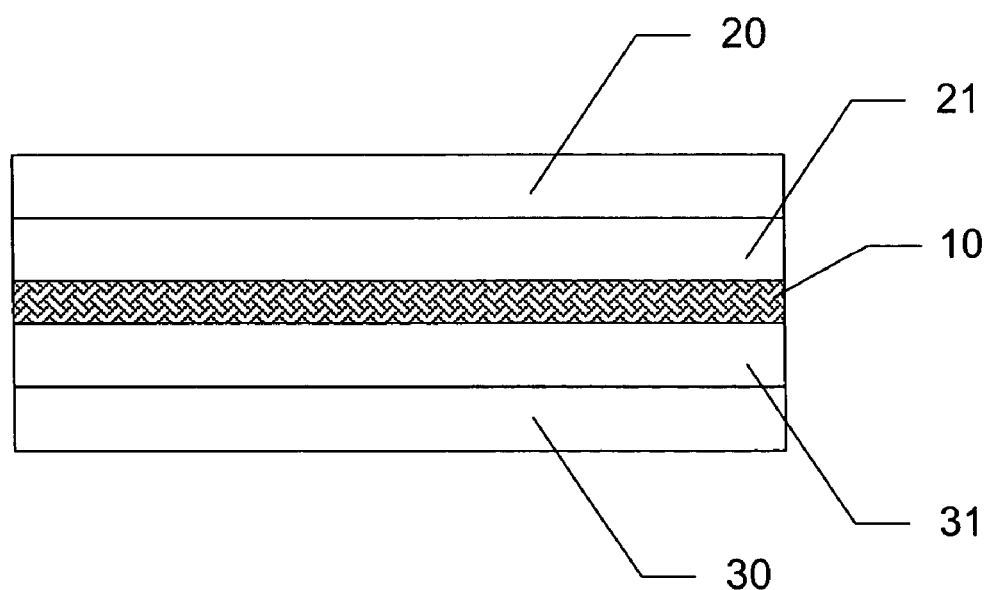
FIG. 2 illustrates a sectional view of a soft tactile coated woven fabric of the present invention with multiple upper and multiple lower soft tactile coating layers.

As illustrated in FIG. 1 and FIG. 2 coated fabrics comprise an inner woven fabric 10 and one or more upper and lower coating layers. Preferably woven fabric 10 comprises multi-filament polyolefin yarn woven into fabric. Techniques and methods of producing woven fabrics are well known in the art.

As used herein "superior soft tactile characteristic" refers to pleasing soft tactile finish that is low gloss, non-tacky, non-slick and approaches the tactile sensation of microfiber polyolefin textile. Soft tactile characteristics of fabrics are known in the art as the "hand" of the fabric or the perceived softness of the fabric. In general, the perceived softness is measured manually by the use of a hand panel evaluation or by the use of instruments to simulate hand panel evaluations. For example, the Kawabata Evaluation System may be employed to simulate hand panel evaluations.

As used herein "polyolefin woven fabric extrusion coating" refers to coatings that are extrusion coated onto polyolefin woven fabric with good adhesion, high flexibility and crack resistance. Polyolefin woven fabric extrusion coatings must be compatible with the woven fabric to which they are applied. In general, such coatings require liquid surface tension equal or less than the critical wetting surface tension of woven fabric. In the case of polypropylene woven fabric the critical wetting surface tension is approximately 29 dyne/cm. In the case of polyethylene woven fabric the critical wetting surface tension is approximately 31 to 31.5 dyne/cm.

The soft tactile coatings of the present invention comprise 30 to 50% by weight elastomer and 30 to 50% by weight thermoplastic vulcanizates. Preferred elastomers include soft touch elastomers such as ADVANTECH™ brand polyolefin elastomer from DuPont Canada and ENGAGE® brand polyolefin elastomer from DuPont Dow Elastomers. When used in extrusion coating lines, suitable elastomers are those with relatively low melt index (e.g. 5.0 or lower). For example, ADVANTECH™ 7701 is a suitable polyolefin elastomer with a melt index of <1 per ASTM D2240. Such elastomers provide good melt strength that is advantageous in high speed coating lines as well as uniform die flow.

Thermoplastic vulcanizates (TPVs) are a special class of thermoplastic elastomers that contain a crosslinked rubber phase dispersed within thermoplastic polymer. TPVs combine properties of crosslinked rubbers yet have processability approaching that of thermoplastic polymers. TPVs are noted for low compression set and high flexibility along with good solvent resistance. In general, TPVs have properties between olefinic thermoplastic elastomers and urethanes.

Preferred thermoplastic vulcanizates include the SANTOPRENE® brand thermoplastic vulcanizates available from Advanced Elastomer Systems and the HiLast™ brand thermoplastic vulcanizates available from HiTech Polymers. Suitable grades include those with a Shore A hardness from 54 to 80 ("Shore A hardness" refers to hardness measured according to ASTM D2240-85 using a Type A durometer.) For example, SANTOPRENE® 8291-70 and 8691-70 are suitable grades of thermoplastic vulcanizate. Particularly preferred is grade 8691-70 due to its lighter color, although the brownish hue of 8291-70 may be desirable when for earth tone colors are being formulated. Comparable HiLast™ grades are TPV 2065, TPV 2073 and TPV 2075. Use of TPVs having a shore hardness below 54 (e.g. 30–54) may also be used with appropriate adjustments in extrusion coating equipment in order to compensate for higher melt flow rates of such TPVs. Present commercial TPVs having a hardness below 30, have a melt flow rate too high to be easily mixed with other components of the invention. Diverse melt flow rates can cause undesirable phase separation in the coating.

When used in extrusion coating of a polyolefin woven fabric it is desirable that the thermoplastic vulcanizate selected have relatively low hardness.

It has been surprisingly discovered that the combination of thermoplastic vulcanizate with polyolefin elastomer creates coatings with superior soft tactile characteristics not attainable with either thermoplastic vulcanizate or elastomer alone.

The coatings may comprise other additives in amounts up to 30% by weight and include, for example, antioxidants (e.g., hindered phenols such as, for example, IRGANOX® 1010, and phosphites, e.g., IRGAFOS® 168, (both are registered trademarks of, and supplied by Ciba-Geigy Corporation, NY), U.V. stabilizers (including TINUVIN® 328 and CHIMASSORB® 944, both are registered trademarks of, and supplied by Ciba-Geigy Corporation, NY, Ampacet Corporation UV100, based on Ciba Specialty Chemical's proprietary SHELFPLUS®), flame retardant agents (available from A. Schulman of Akron, Ohio, Clariant of Easton, Maryland and Technical Polymer Representatives of Amherst, Ohio), slip agents (such as erucamide and/or stearamide), antiblock additives, printable additives, A. Schulman paper match additives, polar additives, colorants, and pigments, to the extent that such additives do not interfere with the adhesive and soft tactile properties of the coatings.

Additives may require the use of a compatible carrier copolymer. Suitable copolymers include ethylene-octene copolymers comprising 10–30% by weight octene and are available commercially as EXACT® brand plastomers from Exxon. For example, the plastomer EXACT® 0210 has been found suitable as a compatible carrier. Other suitable carriers include polypropylene homopolymer compatible with the thermoplastic vulcanizate portion of the coating. U.S. Pat. No. 6,486,278 further discloses methods of producing ethylenic plastomers.

It has been found that the soft tactile characteristic can be varied with the addition of plastomer copolymer in amounts from 5% to 15% by weight. The plastomer further enhances the soft tactile characteristic.

When used, pigments and colorants are preferably added as part of a color masterbatch. The color masterbatch is formed by combining the pigments (colorant) with a polypropylene and/or polyethylene carrier compatible with the elastomeric coatings. In general, compatible carriers can be determined by creating extruded melt blends and testing for phase separation in the extrudate.

Particularly preferred for inner woven fabric 10 are polypropylene woven fabrics. Such fabrics are known for good strength, high flexibility, low cost and ease of manufacture. Further, numerous commercial sources exist for such fabrics.

The thickness of inner woven fabric layer 10 varies according to the intended use of the coated product. For example, a woven polypropylene fabric may have a thickness of from 5 to 20 mils when formed of 1000 denier yarns with a nominal 16×16 ppi weave.

Upper layer 20 and lower layer 30 of FIG. 1 comprise soft tactile coatings of the present invention. Such coatings may be applied to inner woven fabric layer 10 by using such techniques as extrusion coating (i.e., extruding one layer onto the other), lamination (i.e., bonding layers together under heat and pressure), and solvent coating.

The coatings of the present invention are particularly suitable for extrusion coating onto inner woven fabric 10. Extrusion coating of a layer of scrim may be accomplished by melting the coating in an extruder and extruding through a film die onto the woven fabric. The molten polymer and fabric are transported between a nip roll and a large chill roll to cool the molten elastomeric coatings.

The thickness of upper coating layer 20 and lower coating layer 30 will vary according to the intended use of the coated product. For most uses, coating thicknesses will vary from 1 to 10.0 mils, with 5 mils being typical. Thinner coatings may be advantageous for certain textile applications and thicker coatings may be used for heavy-duty exterior services or where high abrasion resistance is desirable.

FIG. 2 illustrates fabrics of the present invention comprising more than one upper or lower coating layer. For example, inner woven fabric 10 may have an outer upper coating layer 20 and one or more inner upper coating layers 21. Similarly, the coated fabric may have an outer lower coating layer 30 and one or more inner lower coating layers 31.

The added layers of FIG. 2 allow for economical variations in the additives for each coating layer. For example, ultraviolet light inhibitors, pigments or flame retardant additives can be limited to inner coating layers. Higher additive concentration levels are thus attainable without reducing the soft tactile characteristic of the outer coating layer.

The total combined thickness of upper coating layers 20 and 21, as well as lower coating layers 30 and 31 will vary according to the intended use of the coated product. For most uses, combined coating thickness will vary from 1 to 10 mils, with 5.0 mils being typical. Thinner coatings may be advantageous for certain textile applications and thicker coatings may be used for heavy-duty exterior services or where high abrasion resistance is desirable.

The coated woven material of the present invention may be used in a wide variety of end uses including covering of trucks, flexible sign facing, banner fabrics, geomembranes, liquid containment systems, awnings, textile and upholstery fabrics. A wide variety of other uses will be apparent to persons skilled in the art, including uses currently employing PVC coated fabrics.

The invention is illustrated, but not limited by the following examples:

EXAMPLES

An article comprising a woven polypropylene fabric of multi-filament yarn was coated with the coatings of the present invention. The woven fabric was a nominal 16×16 ppi weave of clear polypropylene 1000 denier yarn. The coatings are applied in an extrusion coating process (lower coating first, upper coating second). Examples of coatings having superior soft tactile characteristic with suitable adhesion and flexibility are given in Table 1 and Table 2.

TABLE 1

Example Coating 1

| Resin | Supplier | Concentration (%) |
|---|---|---|
| SANTOPRENE ® 8691-70 brand bondable thermoplastic vulcanizate (TPV) | AES | 45 |
| ADVANTECH ® 7701 brand elastomer | Dupont Canada | 45 |
| EXACT ® 0210 brand plastomers | Exxon | 7 |
| UV 100 | Ampacet | 3 |

TABLE 2

Example Coating 2

| Resin | Supplier | Concentration (%) |
|---|---|---|
| SANTOPRENE ® 8691-70 brand bondable thermoplastic vulcanizate (TPV) | AES | 37 |
| ADVANTECH ® 7701 brand elastomer | Dupont Canada | 37 |
| EXACT ® 0210 brand plastomers | Exxon | 10 |
| UV 100 | Ampacet | 7 |
| UV Stabilizer | | 3 |
| Slip Additive | | 3 |
| Anti-block Additive | | 3 |

The composition of compare coatings are given in Table 3 and Table 4. Neither of the compare coatings provided the desired superior soft tactile characteristic. Table 5 summarizes the results from all of the example coatings using the manual hand panel evaluation method.

TABLE 3

Compare Coating 1

| Resin | Supplier | Concentration (%) |
|---|---|---|
| SANTOPRENE ® 8691-70 brand bondable thermoplastic vulcanizate (TPV) | AES | 90 |
| EXACT ® 0210 brand plastomers | Exxon | 7 |
| UV 100 | Ampacet | 3 |

TABLE 4

Compare Coating 2

| Resin | Supplier | Concentration (%) |
|---|---|---|
| Advantech 7701-A | Dupont Canada | 90 |
| EXACT ® 0210 brand plastomers | Exxon | 7 |
| UV 100 | Ampacet | 3 |

TABLE 5

Coating Properties

| Coating | Tactile quality | comments |
|---|---|---|
| Example 1 | superior - silky smooth soft feel | good adhesion, good flexibility, excellent processability for extrusion coating |
| Example 2 | superior - extra silky smooth soft feel | excellent adhesion, good flexibility, excellent colorability, excellent processability for extrusion coating |
| Compare 1 | tacky, glossy feel | poor adhesion, low abrasion resistance |
| Compare 2 | hard, glossy feel | poor processability for extrusion coating |

Although the present invention has been described in terms of specific embodiments, various substitutions of materials can be made as will be known to those skilled in the art. For example, the thermoplastic vulcanizate may be selected to provide the desired pigment or to include desired additives such as UV stabilizer or flame retardant. Other variations will be apparent to those skilled in the art and are meant to be included herein. The scope of the invention is only to be limited by the following claims:

What is claimed is:

1. The method of forming a coated polyolefin fabric comprising:
   weaving a polyolefin fabric of multi-filament polyolefin yarn;
   extrusion coating the lower surface of the polyolefin fabric with a polyolefin woven fabric extrusion coating;
   extrusion coating the upper surface of the polyolefin fabric with a polyolefin woven fabric extrusion coating; and
   cooling the coated polyolefin fabric;
   wherein the polyolefin woven fabric extrusion coatings comprise from 30 to 50% by weight thermoplastic vulcanizate wherein the thermoplastic vulcanizate has a Shore A hardness grade of 30 to 80; from 30 to 50% by weight of polyolefin elastomer wherein the polyolefin elastomer has a melt index of less than or equal 5.0; and from 5 to 15% by weight of plastomer.

2. The method of claim 1 wherein the thermoplastic vulcanizate has a Shore A hardness grade of 54 to 80.

3. A coated polyolefin fabric comprising:
   an inner polyolefin woven fabric of multi-filament polyolefin yarn;
   one or more lower coating layers of polyolefin woven fabric extrusion coating;
   one or more upper coating layers of polyolefin woven fabric extrusion coating;
   wherein the polyolefin woven fabric extrusion coatings comprise from 30 to 50% by weight thermoplastic vulcanizate wherein the thermoplastic vulcanizate has a Shore A hardness grade of 30 to 80; from 30 to 50% by weight of polyolefin elastomer wherein the polyolefin elastomer has a melt index of less than or equal 5.0; and from 5 to 15% by weight of plastomer.

4. The coated polyolefin fabric of claim 3 wherein the thermoplastic vulcanizate has a Shore A hardness grade of 54 to 80.

5. The coated polyolefin fabric of claim 3 wherein the inner polyolefin woven fabric further comprises polypropylene multi-filament yarn.

6. The coated polyolefin fabric of claim 5 wherein the thermoplastic vulcanizate has a Shore A hardness grade of 54 to 80.

7. The coated polyolefin fabric of claim 5 wherein the inner polyolefin woven fabric comprises 1000 denier polypropylene yarn on a nominal 16×16 ppi weave.

8. The coated polyolefin fabric of claim 7 wherein the thermoplastic vulcanizate has a Shore A hardness grade of 54 to 80.

9. The coated polyolefin fabric of claim 3 wherein the lower coating layers comprise a total coating thickness of from 1 to 10.0 mil.

10. The coated polyolefin fabric of claim 9 wherein the thermoplastic vulcanizate has a Shore A hardness grade of 54 to 80.

11. The coated polyolefin fabric of claim 3 wherein the upper coating layers comprise a total coating thickness of from 1 to 10.0 mil.

12. The coated polyolefin fabric of claim 11 wherein the thermoplastic vulcanizate has a Shore A hardness grade of 54 to 80.

* * * * *